UNITED STATES PATENT OFFICE.

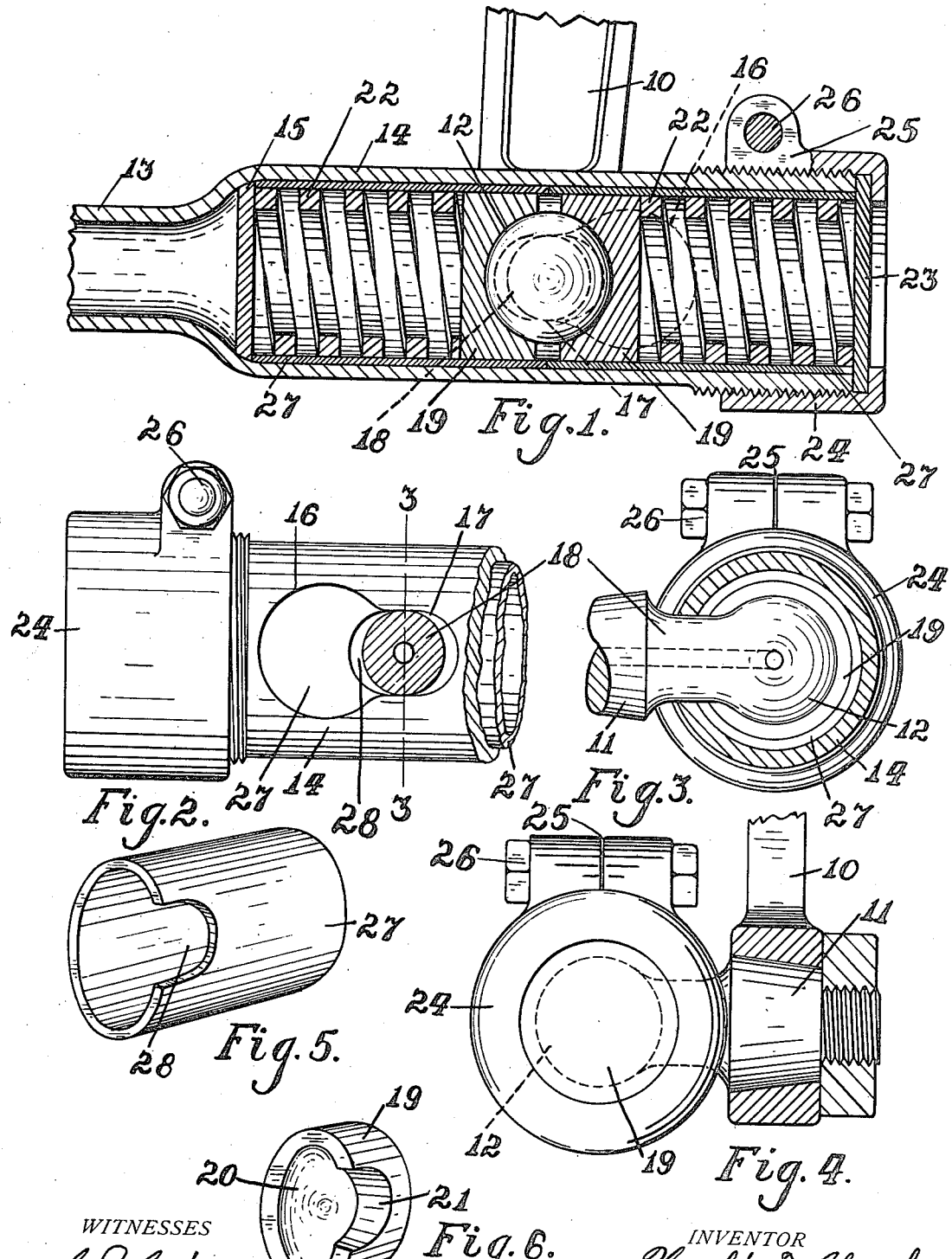

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

BALL-AND-SOCKET CONNECTION.

1,159,473.　　　　　　　Specification of Letters Patent.　　　　Patented Nov. 9, 1915.

Application filed January 9, 1913. Serial No. 741,071.

*To all whom it may concern:*

Be it known that I, HAROLD D. CHURCH, a citizen of the United States, and resident of Detroit, Wayne county, State of Michigan, have invented certain new and useful Improvements in Ball-and-Socket Connections, of which the following is a specification.

This invention relates to motor vehicles, and particularly to the steering connections thereof.

The invention may also be said to relate broadly to ball and socket connections, and it is shown as applied to the steering arm and link of a motor vehicle.

The primary object of the invention is to form a flexible connection between the steering arm of a motor vehicle and the link connecting such arm with the front wheel spindle, which flexible connection will be somewhat resilient for the purpose of taking shocks transmitted to it, and which will be provided with means for limiting the relative movement of the parts and for holding the parts together in case of failure of the springs or other resilient parts.

Other objects of the invention are to produce a connection of the above character that will be simple and cheap to manufacture, and one that can be easily assembled and disassembled, and in which wearing parts can be easily renewed.

With a view to attaining these and other objects which will be apparent from the following description, the invention consists in the features of construction and arrangement of parts hereinafter more fully described and specified in the claims.

Referring to the drawings, Figure 1 is a longitudinal section through a connection embodying the invention; Fig. 2 is an elevation of the reverse side of the steering connection shown in Fig. 1, with parts cut away; Fig. 3 is a section approximately on the line 3—3 of Fig. 2; Fig. 4 is an end view of the connection shown in Fig. 1, with the lower end of the steering arm shown in section; and Figs. 5 and 6 are perspective views of detail.

The invention consists of two principal parts, which may be herein termed the "ball member" and the "tubular member", and it comprises a connection between these members which permits the ball member to move the tubular member longitudinally of the latter, while at the same time permitting slight oscillations of the tubular member around the center of the ball of the ball member, such as will be produced when the connection is employed in the steering arm and link of a motor vehicle.

In the drawings, the ball member comprises the steering arm 10, in the end of which is integrally formed, or detachably secured, a lateral arm 11, having its end formed in the shape of a ball 12. The tubular member consists of a link 13, the end of which is shown as of tubular form and enlarged, as at 14, and the inner end of the enlarged portion is closed by a disk 15, forming an abutment. In the side of the portion 14 of the tubular member is a key-hole slot 16, shown in dotted lines in Fig. 1 and in full lines in Fig. 2. The large part of this slot is slightly larger than the ball 12, so that the latter may enter the tubular member at this point, and the contracted portion 17 of the keyhole slot allows a free fit for the neck or shank portion 18 of the arm 11.

From the above, it will be observed that the ball may be inserted through the large part of the slot 16 and then moved longitudinally of the tubular member, so that the neck 18 is confined by the part 17 of the slot, whereby the ball member is retained against lateral movement in the tubular member.

Within the tubular member are arranged two socket pieces 19, each of which has a hemispherical depression 20 therein and a semi-cylindrical slot 21, as shown in detail in Fig. 6. Thus these socket pieces fit closely about the ball 12, and the neck 18 extends through the slots 21, and the socket pieces are held yieldingly against the ball by springs 22, one on each side, as shown in Fig. 1. The inner spring abuts against the disk 15, and a disk 23 is pressed against the end of the outer spring by means of a screw-cap 24 having threaded connection with the outer face of the tubular member. A long threaded connection is shown, in order to permit the springs 22 to be placed under considerable tension, whereby the ball member will have very slight movement relative to the tubular member, the springs being provided only for the purpose of taking shocks and vibration, and not intended to yield to any great extent. The cap 24 is preferably split, as shown at 25, and a bolt 26 is provided to tighten it around the tubular member after it has been screwed onto the same.

With the construction above described, it will be seen that so long as the springs 22 hold and the outer spring does not give too much, the ball member is prevented from being removed from the tubular member, but in case of fracture of the outer spring 22 or its too great depression, there would be nothing to prevent the ball member from dropping out through the enlarged part of the slot 16. Therefore, for the purpose of limiting the relative movement of the parts and for securing them in case of failure of the springs, the means hereinafter described are provided.

Two coöperating sleeves 27 are arranged to fit closely inside of the portion 14 of the tubular member and to be held therein between the abutment 15 and the disk 23. The socket pieces 19 and the springs 22 are arranged inside of these sleeves 27, so that the sleeves virtually form a removable lining for the tubular member, and the wear is thereby easily taken up by renewing either the socket pieces or the sleeves. The sleeves 27 have slots 28 formed in their abutting ends, and these slots register with the slots 21 in the socket pieces 19 and surround the neck 18 of the ball member. The slots 28, however, are slightly longer than the slots 21, thus permitting the neck 18 to slide in them as they carry the socket pieces 19 one way or the other in resisting shocks and vibration, and the length of the slots 28 determines the amount of relative movement permitted. In any event, they are not sufficiently long to permit the ball 12 to be removed through the enlarged part of the slot 16, and it is necessary therefore to assemble the outer sleeve 27 after the inner sleeve, the inner spring, the inner socket piece, and the ball member have all been inserted in their proper positions within the tubular member. The outer sleeve can then be assembled, the outer socket piece inserted, the outer spring placed within the sleeve, and the disk 23 and cap 24 screwed into place.

It is believed that the operation of the device is apparent from the above description, and while a specific embodiment of the invention has been herein described, yet it must be understood that the invention is not limited to the exact details of construction shown, as it will be apparent that changes may be made without departing from the spirit and scope of the invention.

Having thus described my invention, what I claim and desire to secure by Letters Patent is:

1. The combination with a tubular member having an opening in one side, of a ball member adapted to enter said opening and having a neck portion adapted to operate freely in said opening endwise of the tubular member, socket pieces within the tubular member on both sides of the ball member, spring means for pressing the socket pieces toward each other, and means in addition to the walls of said slot acting upon said neck portion of the ball member for limiting the movement of said ball member endwise of the tubular member.

2. The combination with a tubular member having an opening in one side, of a ball member adapted to enter said opening and having a neck portion adapted to operate freely in said opening endwise of the tubular member, socket pieces within the tubular member on both sides of the ball member, spring means for pressing the socket pieces toward each other, and means acting independently of the spring means and socket pieces and of the walls of said slot for limiting the movement of said ball member endwise of the tubular member.

3. The combination with a tubular member having a keyhole slot in one side thereof, socket pieces within said member, and springs adapted to normally retain said socket members opposite the reduced part of said slot, of a ball member confined between said socket pieces, and means acting in addition to said springs and the walls of said slot for limiting the movement of said ball member endwise of the tubular member.

4. The combination with a tubular member having a keyhole slot in one side thereof, socket pieces within said member, and springs adapted to normally retain said socket members opposite the reduced part of said slot, of a ball member comprising a ball portion confined between said socket pieces and a neck portion extending through said slot, and means other than the walls of said slot acting upon said neck portion to limit the movement of said ball member endwise of the tubular member.

5. The combination with a tubular member having a keyhole slot and an internal abutment, socket pieces within said member, springs on both sides of said pieces, and a cap on the end of said member adapted to confine said springs and socket pieces between itself and said internal abutment so that the socket pieces lie normally opposite the reduced portion of said slot, of a ball member comprising a ball portion adapted to enter through the large portion of said slot and be confined between said socket pieces and a neck portion operating in the reduced portion of said slot when the parts are in normal position, and means acting independently of said springs and of the walls of said slot to limit the movement of said ball member endwise of the tubular member.

6. The combination with a tubular member having a keyhole slot and an internal abutment, socket pieces within said member, springs on both sides of said pieces, and a cap on the end of said member adapted to confine said springs and socket pieces between itself and said internal abutment so that the socket pieces lie normally opposite the reduced portion of said slot, of a ball member comprising a ball portion adapted to enter through the large portion of said slot and be confined between said socket pieces and a neck portion operating in the reduced portion of said slot when the parts are in normal position, and a removable sleeve within said tubular member for limiting the movement of the ball member endwise of the tubular member.

7. The combination with a tubular member having a keyhole slot and an internal abutment, socket pieces within said member, springs on both sides of said pieces, and a cap on the end of said member adapted to confine said springs and socket pieces between itself and said internal abutment so that the socket pieces lie normally opposite the reduced portion of said slot, of a ball member comprising a ball portion adapted to enter through the large portion of said slot and be confined between said socket pieces and a neck portion operating in the reduced portion of said slot when the parts are in normal position, and a pair of coöperating removable sleeves surrounding said socket pieces and springs and forming a slot corresponding to the reduced part of said keyhole slot to thereby limit the movement of the ball member.

8. The combination with a tubular member having a side slot, of a ball member adapted to operate in said tubular member with its neck portion in said slot, socket pieces within the tubular member on both sides of the ball member, spring means for pressing the socket pieces toward each other whereby yielding movement of the socket pieces and ball member endwise of the tubular members is permitted, and a wearing sleeve within the tubular member and surrounding the socket pieces.

9. The combination with a tubular member having a side slot, of a ball member adapted to operate in said tubular member with its neck portion in said slot, socket pieces within the tubular member on both sides of the ball member, spring means for pressing the socket pieces toward each other whereby yielding movement of the socket pieces and ball member endwise of the tubular members is permitted, and a two-part wearing sleeve surrounding the socket pieces and arranged within and removable from the tubular member.

10. The combination with a tubular member having a side slot, of a ball member adapted to operate in said tubular member with its neck portion in said slot, socket pieces within the tubular member on both sides of the ball member, spring means for pressing the socket pieces toward each other whereby yielding movement of the socket pieces and ball member endwise of the tubular members is permitted, and a sleeve arranged between the tubular member and the socket pieces and having means for limiting the movement of the ball member endwise of the tubular member.

11. The combination with a tubular member having a side slot, of a ball member adapted to operate in said tubular member with its neck portion in said slot, socket pieces within the tubular member on both sides of the ball member, spring means for pressing the socket pieces toward each other whereby yielding movement of the socket pieces and ball member endwise of the tubular members is permitted, and a two part wearing sleeve surrounding the socket pieces and arranged within and removable from the tubular member, said sleeve having means for limiting the movement of the ball member endwise of the tubular member.

In testimony whereof I affix my signature in the presence of two witnesses.

HAROLD D. CHURCH.

Witnesses:
LE ROI J. WILLIAMS,
H. B. KNAP.